(12) United States Patent
Prochazka et al.

(10) Patent No.: US 7,739,788 B1
(45) Date of Patent: Jun. 22, 2010

(54) SUPPORT STRUCTURE WITH INTEGRAL RETAINER TABS FOR USE IN SPINDLE MOTOR WIRE ROUTING

(75) Inventors: Vaclav Prochazka, Lyons, CO (US); Torin Meyers, Thornton, CO (US); Wendy Lorimer, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 1072 days.

(21) Appl. No.: 11/292,212

(22) Filed: Nov. 30, 2005

Related U.S. Application Data

(60) Provisional application No. 60/632,382, filed on Dec. 2, 2004.

(51) Int. Cl.
*H01F 7/06* (2006.01)

(52) U.S. Cl. .......................... 29/605; 29/602.1; 29/606; 29/729; 29/742; 310/179; 310/184; 310/208

(58) Field of Classification Search ................ 29/592.1, 29/596, 602.1, 605, 606; 310/179, 184, 208
See application file for complete search history.

(56) References Cited

U.S. PATENT DOCUMENTS 5,355,043 A * 10/1994 Kaneda ................. 310/156.08
5,861,696 A * 1/1999 Hartman et al. ........ 310/156.43

* cited by examiner

*Primary Examiner*—Paul D Kim
(74) *Attorney, Agent, or Firm*—Shumaker & Sieffert, P.A.

(57) ABSTRACT

A base plate for magnetic disk drives is provided that includes a hooked protrusion integrated therein between adjacent spindle motor coils. The cross-over wires that span between adjacent coils are secured by the hooked protrusions, thereby optimizing coil height and reducing manufacturing steps. The hook-like protrusions of one embodiment of the present invention are preferably stamped into the base plate.

40 Claims, 8 Drawing Sheets

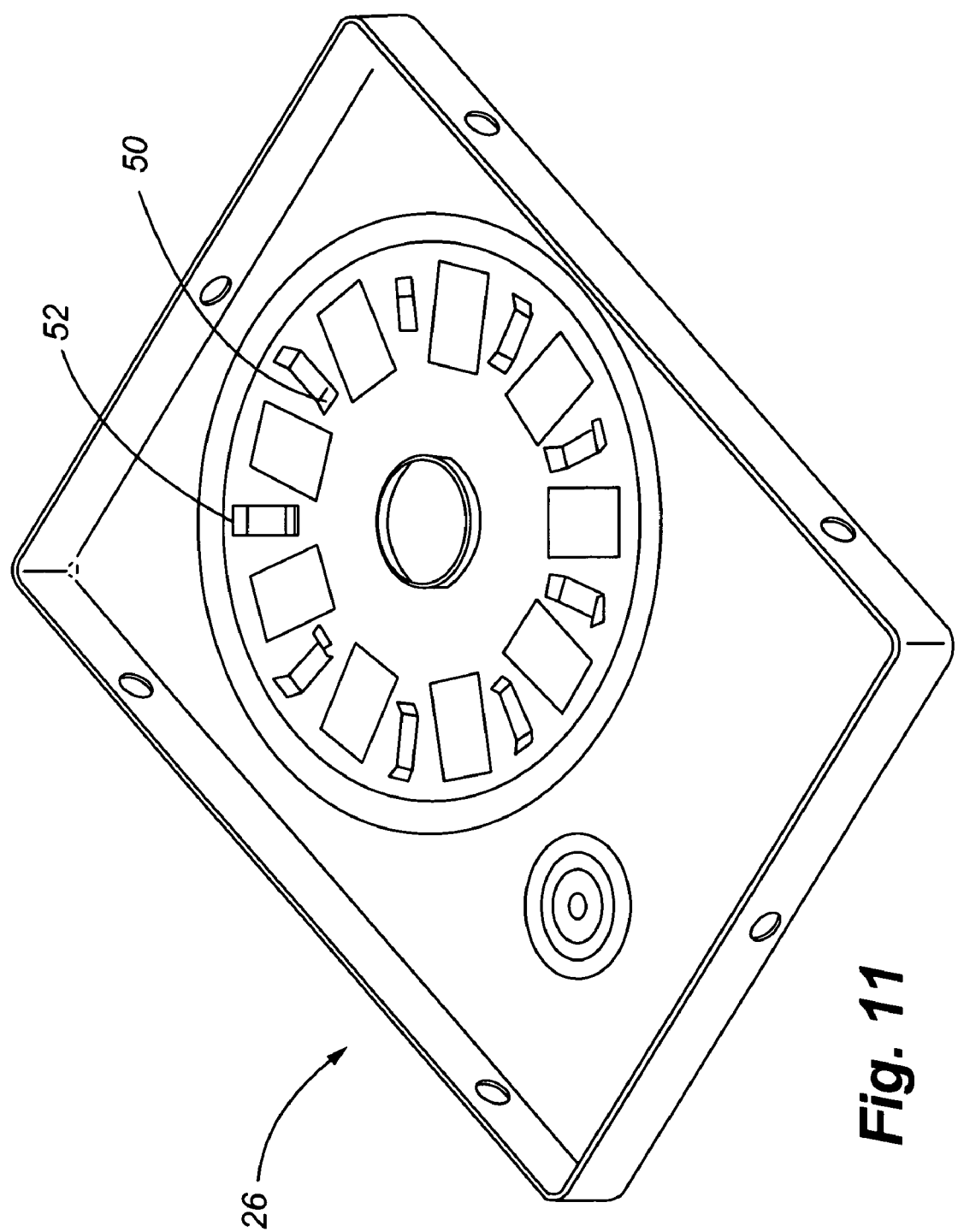

SUPPORT STRUCTURE WITH INTEGRAL RETAINER TABS FOR USE IN SPINDLE MOTOR WIRE ROUTING

CROSS REFERENCE TO RELATED APPLICATIONS

This application claims the benefit of U.S. Provisional Patent Application Ser. No. 60/632,382 filed Dec. 2, 2004, which is incorporated by reference in its entirety herein.

FIELD

The present invention relates to low-profile motors such as, for example, spindle motors for disk drives.

BACKGROUND

Micro drives are low profile miniature hard disk drives for portable applications, such as personal digital assistants, cell phones, music players, camera, digital recorders, etc. A micro drive includes the basic components of a conventional hard disk drive, but is much smaller. More particularly it includes rotatable media, i.e., one or more hard disks, a hub on which the one or more disks are mounted, a spindle affixed to a base plate and about which the hub and media rotate, and an electric motor to effectuate rotation of the hub and media. The electric motor typically comprises a rotor and a stator. The rotor may comprise one or more permanent magnets positioned about the hub, and the stator may comprise a plurality of fixed electromagnets disposed in a circular pattern proximate the permanent magnets on the hub or rotor. Controlling current flow through the electromagnets causes the hub and media to rotate.

The stator generally includes a circular member or yoke. Generally, a plurality of teeth extend inwardly from the circular portion of the yoke and are wrapped with wire to form individual electromagnets. However, the teeth can either extend inwardly or outwardly, depending on whether the motor is an interior or exterior stator type, as will be appreciated by one of skill in the art. Typically, an interior stator is employed in a 2.5" and larger disk drive, wherein smaller form-factor drives employ an exterior stator because there is sufficient radial space for the windings. The yoke and teeth are normally a laminate, constructed from a number of layers of conductive material, although they may be a single core instead of a laminate. Each tooth has a distal and proximate end. The proximate end of each tooth is connected to the circular portion of the yoke and the distal end is opposite the proximate end and adjacent the permanent magnets mounted on the hub. Normally, disk drives use three phase electric motors and, therefore, the number of teeth is a multiple of the number three, e.g. 6, 9, 12 or more. Every third tooth is electrically connected or wired together to form each of the three phases. As outlined herein, every third tooth is wired together to form a single phase (i.e. a 9 slot, 12 pole ABC winding is described), but one skilled in the art will appreciate that other windings are possible depending on the number of poles and the number of slots provided. Thus, three separate wires would be used to individually control each phase of the motor. Coordinating the current flow through the independent wires coiled about the teeth of each phase controls the rotation of the rotor/hub.

Micro drives often utilize in-hub motors, meaning the rotor and stator are positioned inside the hub, or under-hub motors, meaning the stator is positioned underneath the rotor, in order to reduce the height of the motor and thereby reduce the overall height profile of the drive. Another way to reduce height is to alter the windings forming the coils on the stator teeth, which is very applicable with respect to smaller disk drives that must employ an exterior stator motor as described above. Normally, each tooth has multiple layers of windings. The totality of windings on a tooth comprises a coil. Thus, the stator height comprises the height of each tooth, plus two times the coil thickness. The height of each tooth comprises the plurality of conductive laminate layers forming each tooth, also referred to as the core of the electromagnet or a stator core. To alter the stator height, the diameter of the wire may be changed, the number of layers of windings may be changed and/or the height of the core may be changed.

The stator wires that form each coil generally enter and exit the coil at the proximate end of each tooth. This is because, as noted previously, the wires necessarily skip or cross over adjacent teeth in order to be wound in multiple phases. As should be appreciated, routing wires from the distal end of one tooth, either to the distal or proximate end of another tooth, while skipping over two intervening teeth, can cause problems. For example, the cross over wire(s) can interfere with the rotation of the hub, waste valuable space, and pose reliability and noise issues. Thus, in order to avoid interference with the hub, a stator coil will most always have an even number of winding layers in order for the wire to exit the tooth at the proximate end and not cross over any intervening coils. For example, the first layer is formed from the proximate end to the distal end of a tooth and the second layer of the winding is formed from the distal end to the proximate end. The wire will then be routed around the yoke perimeter to the next tooth that is in phase with the previously wound coil. Of course, there may be four or six or more winding layers and not just two. In this way, the wire does not interfere with the rotation of the rotor and, as noted, there will always be an even number of winding layers.

Another drawback of prior art cross-over wire interconnection schemes is that they compel the use of additional hardware. For example, some prior art stators include routing or retainer tabs interconnected to or interleaved within the layers of the stator yoke. The retainer tabs or hooks provide a location around the yoke for engaging and retaining the cross-over wires. This is an acceptable way to retain the cross-over wires in a predetermined location, however, additional complexity is added to the spindle motor which increases costs. Moreover, positioning the retaining tabs on the stator yoke, typically between adjacent teeth, promotes and reinforces the disadvantage that the start and finish of each stator coil still must be located at the proximate end of each tooth near the stator yoke thereby compelling an even number of coil winding layers.

While exiting wires at the proximate end of each stator tooth may simplify the routing of cross-over wires, it can also create other, unrelated limitations. As should be appreciated, to optimally design a disk drive the electric motor should also be optimized. This includes optimizing the characteristics of the stator. In the particular circumstances of a particular motor used in a particular design, it is not always desired simply to maximize the number of windings. For example, it may be desired to increase or decrease the number of laminate layers comprising each stator core, or to utilize an odd number of layers of windings rather than an even number, depending upon the wire diameter or gauge preferably selected for use in the drive. Changing one of these parameters can require changes to one or more of the others to maintain an optimized design. Thus, for small form factor electronic devices, the motor design must accommodate these factors while simultaneously seeking to decrease the height of the motor. Nonetheless, as noted above, in current drives it is more likely that the stator cores will have an even number of winding layers to avoid the problems created by cross-over wiring. As a result, it may not be possible both to optimize the motor and decrease its height. Trade offs may need to be made, such as sacrificing optimum performance to meet height restrictions caused by the number of layers of windings and/or the number of laminate layers, or sacrificing height to meet motor design objectives. The coil may have one less winding layer or one more winding layer than desired. If an additional winding is used, the stator height, and the overall drive height, will increase. If one less layer of windings is used, performance may be negatively affected, as might also be the case with an additional layer, and internal space may be unused and wasted.

Thus, it is a long felt need in the field of micro-drive production to provide a system that allows for an improved cross-over wire retainment strategy thereby providing the ability to decrease the height or thickness of the micro-drive while optimizing the characteristics of the motor for a particular end use application of the disk drive. The following disclosure describes an improved method of routing the cross-over wires between stator teeth that includes the addition of retaining tabs integrated into the base plate of the housing.

SUMMARY OF THE INVENTION

It is one aspect of the present invention to provide a support structure, utilized within a hard disk drive, with a plurality of stator wire retaining tabs. More specifically, one embodiment of the present invention includes a support structure that includes integral pairs of retaining tabs disposed between adjacent stator teeth, with one tab positioned radially inward of the other. For example, one tab is positioned adjacent the distal end and the other positioned adjacent the proximate end of the stator teeth. The retaining tabs provide locations for routing and restraining cross-over wires, thereby eliminating the requirement of having both the beginning and the end of a coil winding layer start at the proximate end of each stator tooth. This arrangement allows the winding layers to begin and/or end at either the proximate or distal end of each tooth. In turn, this arrangement conserves, or potentially reduces, stator height and potentially permits a reduction in disk drive size. It further allows greater flexibility to optimize the characteristics of the spindle motor.

One embodiment of the present invention employs radially disposed inner and outer retaining tabs that are generally opposed metal tabs preferably stamped into the support structure. The tabs are bent to form hook-like members or left in place if not needed. Accordingly, when winding a stator tooth, the cross-over wire may exit the distal end of a tooth and be routed through one or more retaining tabs on the support structure as needed, and then to the next appropriate tooth for winding. Cross-over wires exiting the proximate end of the tooth, near the stator yoke, may be routed through the radially outward tabs and along the stator yoke. Alternatively, cross-over wires that enter or exit from the distal portion of the tooth may be routed through the radially inward facing tabs and are directed around inappropriate teeth along the distal ends of the teeth or along the stator yoke. These retaining tabs also may be used in combination with tabs disposed on the stator yoke.

It is another aspect of the present invention to provide a method of securing cross-over wires that omits the need for additional hardware. Here, the retaining tabs are located on the support structure and not on the stator yoke, thereby eliminating the need for customized tab members or plastic clips disposed on the yoke. Thus, complexity of the system and manufacturing costs are significantly reduced.

It is still yet another aspect of the present invention to provide an optimized spindle motor that includes integral retaining tabs as shown and described herein which allows for odd or even number of stator coil layers, i.e. a more optimized design. This design permits optimizing the electro-magnetic characteristics of the motor. The ability to wrap the laminates in an even or an odd number further allows for a more efficient use of the allocated or available interior space of the disk drive housing. That is, the space traditionally required to return the winding to the yoke for routing to the next stator tooth is eliminated, thereby allowing the size of the micro drive to be decreased or the space allocated for the return wire to be taken up by a better designed motor, including a thicker laminate and/or larger or smaller diameter wires as the optimized design dictates. Optimizing the motor characteristics also increases battery life.

In another embodiment of the invention, only one retaining tab is positioned between adjacent stator teeth. Alternatively, two or more tabs may be positioned between adjacent teeth, and arranged in different configurations. For example, the tabs could be positioned at the same radial location relative to the spindle. They could also be laterally offset relative to each other. Persons of skill in the art will appreciate that the design characteristics of the stator can influence the location of the retainer tabs. Moreover, it should also be appreciated that the tabs may comprise one or more separate component pieces and do no need to be an integral part of the base plate or housing structure supporting the motor.

In a further embodiment of the present invention, the support structure is the base plate of a hard disk drive.

The Summary of the Invention is neither intended nor should it be construed as being representative of the full extent and scope of the present invention. The present invention is set forth in various levels of detail in the Summary of the Invention as well as in the attached drawings and the detailed description of the invention, and no limitation as to the scope of the present invention is intended by either the inclusion or non inclusion of elements, components, etc. in the Summary of the Invention. Additional aspects of the present invention will become more readily apparent from the Detailed Description, particularly, together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 11 is a perspective view of yet another embodiment of the base plate.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
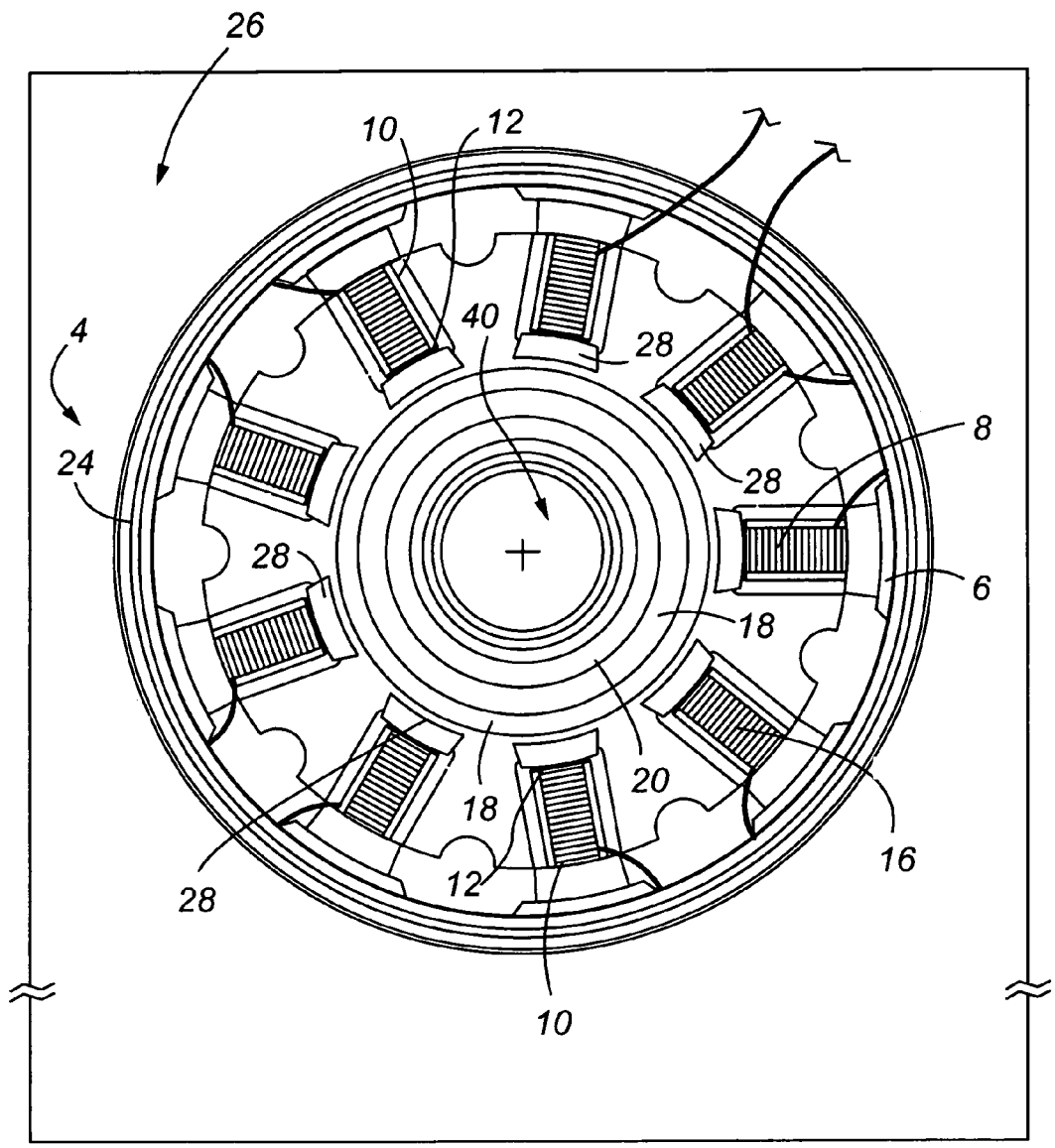
FIG. 1 is a top plan view of an electrical motor of the prior art that utilizes plastic retainer clips to secure cross-over wires.
Figures 2A, 2B:
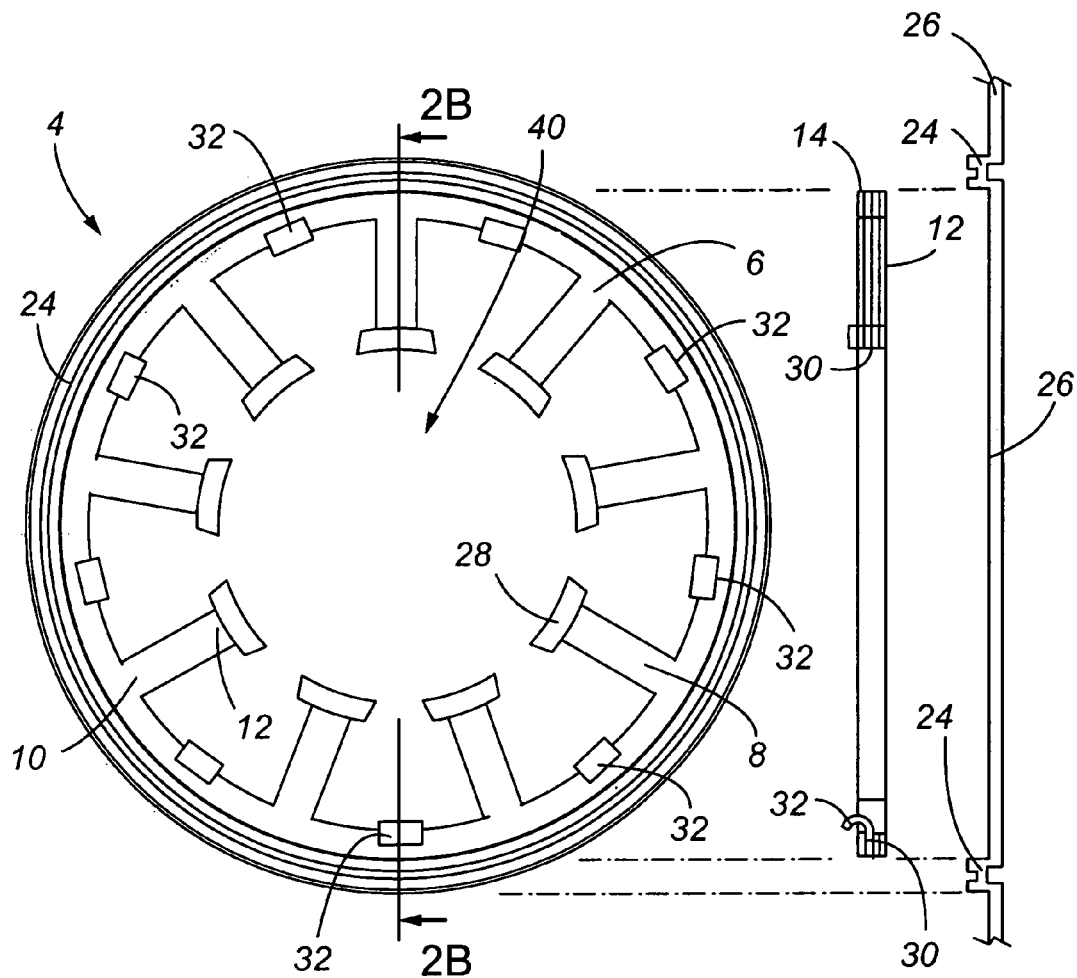
FIG. 2A is a top plan view of the laminations used in the electrical motor of the prior art.
FIG. 2B is a cross sectional view of the embodiment shown in FIG. 2A, taken along line 2B-2B, wherein laminates with an inner profile are shown that are adapted to receive cross-over wires.
Figure 3:
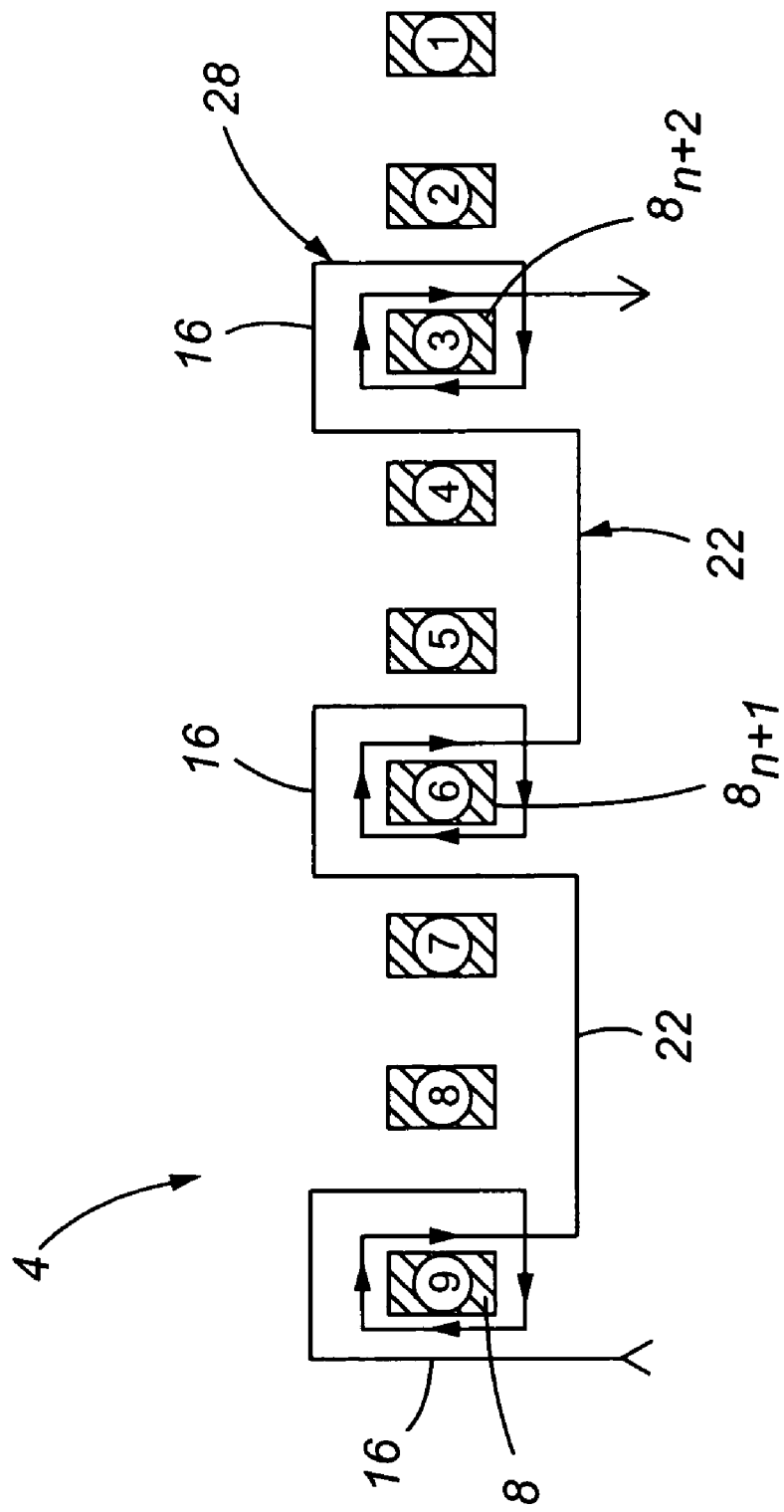
FIG. 3 is a schematic of the method of winding wires around a stator portion of an electrical motor.

Referring now to FIGS. 1-3, a stator portion 4 of a prior art electric motor is shown that includes a stator yoke 6 interconnected to a plurality, radially inwardly extending stator teeth 8. Each tooth has a proximate end 10 wherein the tooth joins the stator yoke 6, and a distal or free end 12 opposite the proximate end. As shown in FIGS. 2A and 2B, the yoke 6 and teeth 8 consist of a plurality of stacked laminates. The laminates comprise an electrically conductive material, such as iron or compounds including iron, to assist in the formation of an electromagnet. Together, the laminates 14 of each tooth comprise a core. As shown in FIG. 1, each tooth 8 is wound by a wire 16. The stator shown is part of a three-phase motor such that every third tooth is wrapped with the same wire, one skilled in the art will appreciate that embodiments of the present invention described herein are equally applicable for any stator winding scheme. (See, FIG. 3.) Thus, a current flowing through the stator portion 4 of the electric motor will activate groups of three teeth 8 in series to force a permanent magnet 18 operably interconnected to a rotor or hub 20 to rotate, e.g., a three-phase motor. Cross-over wires 22 interconnect one tooth to the next within each phase of the stator. Typically, in a disk drive, the stator yoke 6 fits in a raised ring 24 formed in the base plate 26.

In prior art systems, such as is shown in FIGS. 1-3, cross-over wires enter and exit each tooth 8 from the proximate end 10, adjacent the stator yoke 6, thereby placing them in a location for routing to the next appropriate stator tooth 8. However, routing the wires in this way creates motor design issues involving the back electromotive force (EMF) generated by the permanent magnet 18 on the various coils. EMF is the rate change of magnetic flux of the permanent magnet times the number of turns in the stator coil. More turns in the coil creates a greater back EMF. If the back EMF is too large or too small, motor performance will be negatively affected. An optimum motor design for a fixed disk drive height may call for an odd number of winding layers, but such a design will also position the cross-over portion 22 of wire 16 at the distal end of the tooth 8. Therefore, an additional winding layer is typically added to return the wire to the proximate end of the tooth. As a result, the performance of the motor is negatively altered since, for example, a smaller wire must be used for the tooth to fit into the same volume. Alternatively, the wire 16 may simply be directly returned to the proximate end 10 of the tooth and not wrapped around the core, which is an inefficient use of space. In either instance, a valuable portion of the overall height envelope is used to accommodate the diameter of the additional wire layer. Accordingly, the stator height, including the coil, is increased by one or two wire diameters. In addition, the height of the disk drive as a whole may be increased.

Referring specifically now to FIGS. 2A and 2B, a more concise view of the individual laminates 14 employed by the stator portion 4 of the electric motor is shown. The teeth may have a T-shaped profile with the distal end of the conducting material comprising cross-member 28 that provides for intimate electro-magnetic communication with the permanent magnet 18 interconnected to the rotor and/or hub 20 of a disk drive which rotates in the space 40. One prior art method of retaining the cross-over wires 22 is shown in detail. More specifically, at least one of the laminates 14, i.e. the third laminate 30, includes a portion that is curled to form a hook 32. The hooks 32 are used to secure cross-over wires 22 between adjacent teeth 8 of the spindle motor 4. The drawback of this method of securing the cross-over wires is that customized laminates 14 are needed, thereby increasing the cost and complexity to manufacture the same. As is also illustrated, the hooks 32 are restricted in location to positions around the yoke 6. This limits the manner in which wire 16 may be routed among the teeth 8.

Figure 4:
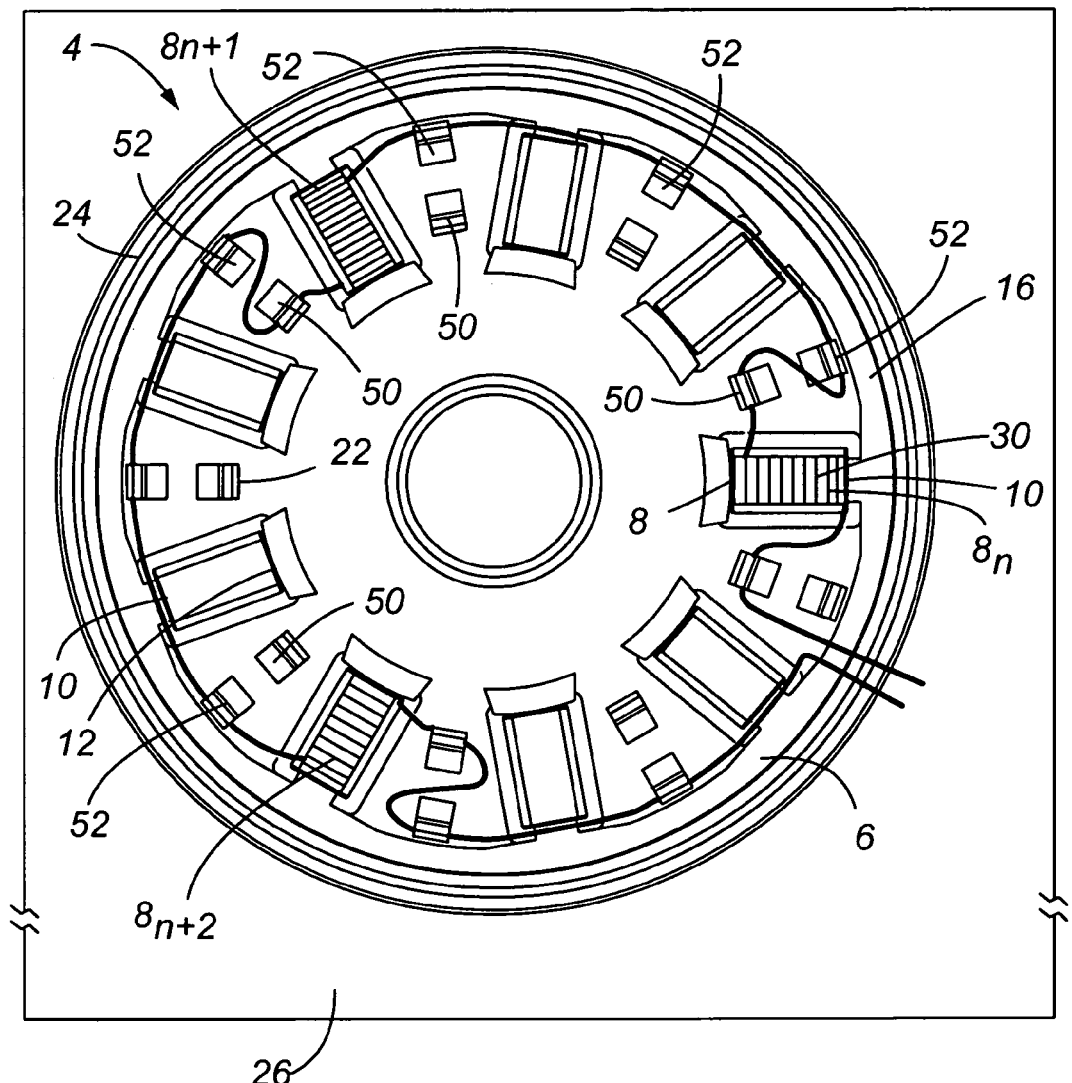
FIG. 4 is a stator portion of an electrical motor interconnected to a base plate of the present invention showing inner and outer retaining tabs.
Figure 5:
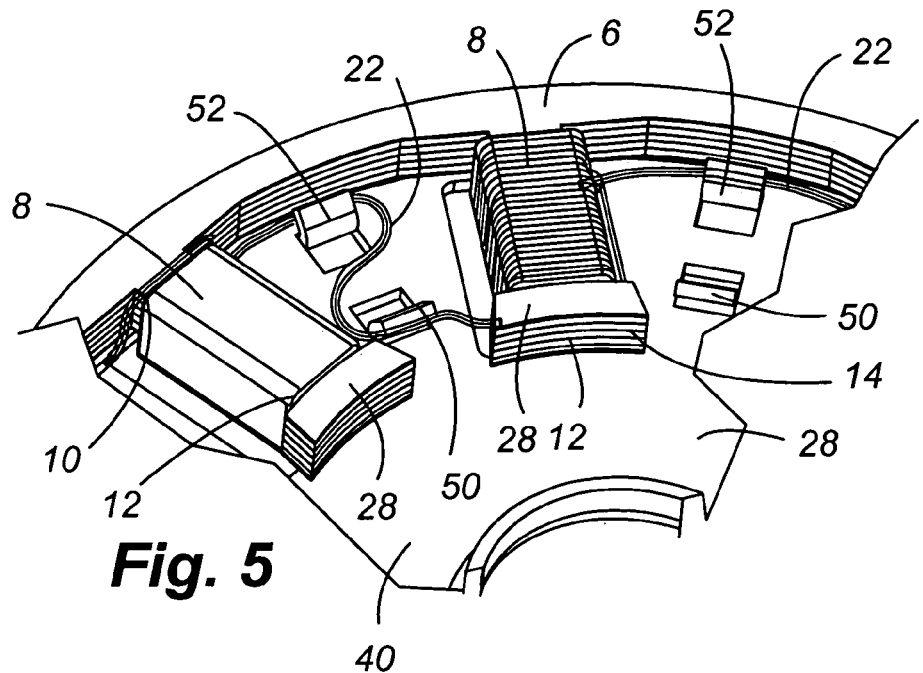
FIG. 5 is a partial perspective view of a laminate and coil combination of one embodiment of the present invention showing the retainer clips securing the cross-over wire.

Referring now to FIGS. 4 and 5, a stator 4 of one embodiment of the present invention is shown. A base plate 26 includes ridge 24 to accommodate the stator. The stator comprises a yoke 6, including nine teeth 8 extending inwardly from the yoke. The individual teeth have a proximate end 10 connected to the yoke 6 and a distal end 12. Each tooth further comprises a number of laminate layers 14, although the core could also be a single, solid piece of material, depending upon the desired characteristics of the motor design. Disposed between each adjacent tooth 8 are a pair of retainer tabs. In the preferred embodiment, there is a radially inner retainer tab 50 and a radially outer retainer tab 52. Only one wire 16 for one phase of the motor is shown, while the remaining two wires have been omitted for clarity. As best illustrated in FIG. 5, the wire 16 is routed starting from the proximate side 10 of a tooth 8 and wrapped around the tooth to yield a coil with an odd number of winding layers 30. In particular, the cross-over wire 22 exits the tooth at the distal end 12. The cross-over wire 22 is then routed to the next appropriate tooth $8_{n+1}$ in the phase with tooth 8, wherein the cross-over wire 22 is secured by the inner retainer tab 50 and the outer retaining tab 52. The wire may then be routed along the stator yoke 6 to the next appropriate tooth $8_{n+2}$ and so on, until the wire exits the stator. Thus, the requirement of bringing the cross-over wire 22 from the distal end 10 of the tooth to the proximate end 12 of the tooth 8 for purposes of routing the wire to the next tooth is eliminated, and a more optimized method of winding stator teeth 8 is provided that permits more efficient use of the space available and permits optimization of the motor.

It should be appreciated that although two tabs are shown, it is within the scope of the present invention to provide a single tab or more than two tabs. The tabs may also be placed side by side at the same radial position or in any other configuration that contributes to optimizing the motor design. The tabs are also shown in a deployed state. As an alternative, the tabs may be deployed only as needed or stamped only as needed such as pursuant to a motor design.

Figure 6:
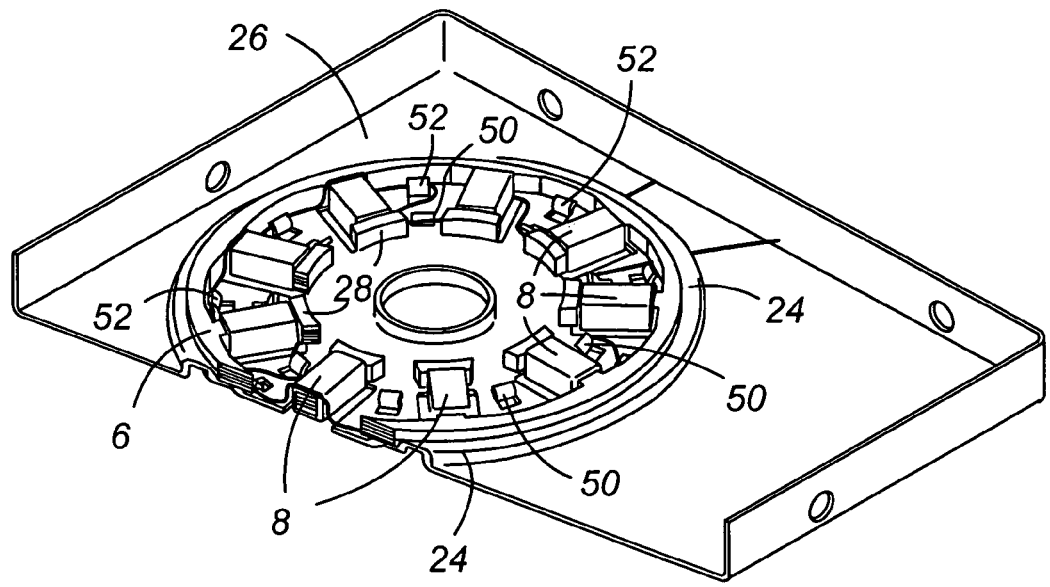
FIG. 6 is a partial perspective view showing the stator portion of the electrical motor of the present invention.
Figure 7:
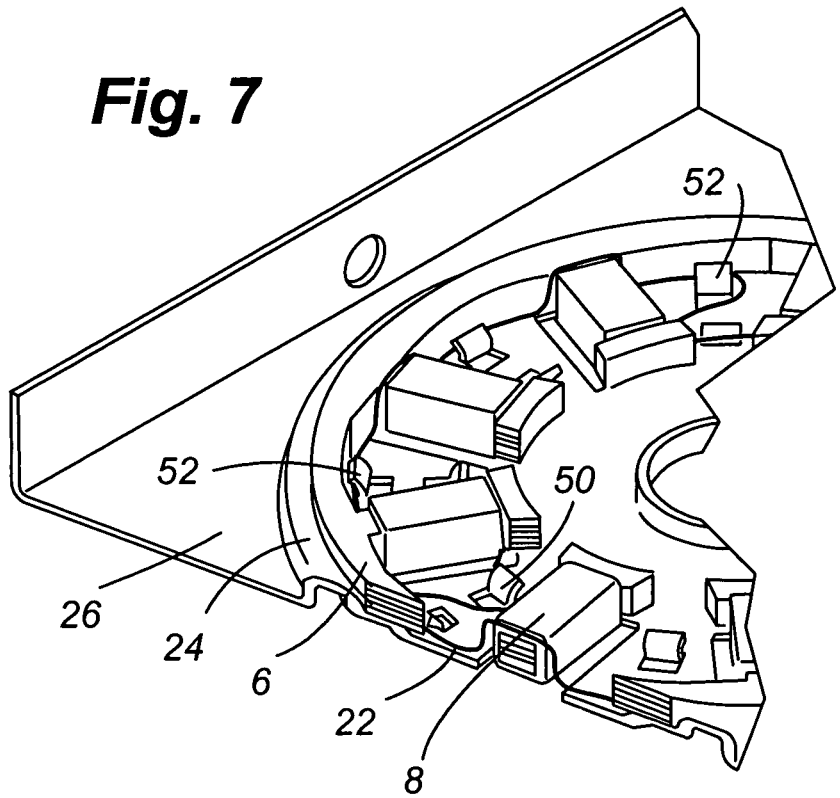
FIG. 7 is a perspective view similar to that shown in FIG. 6 with emphasis directed to the inward and outward retaining tabs.

Referring now to FIGS. 6 and 7, a more detailed view of one embodiment of the present invention is shown that utilizes inner retaining tabs 50 and outer retaining tabs 52. Here it is evident that the retaining tabs may be integrated directly into the base plate 26 by stamping, for example. It is also apparent from the figures that the tabs may be cut from the base plate and bent into place only when needed to support the routing of the wire. Alternatively, all of the tabs may be bent into place wherein only the required tabs are used. One skilled in the art will appreciate that any combination of bending or not bending the retaining tabs into place may be employed without departing from the scope of the invention since deploying extra tabs as shown does not affect the characteristics of the electric motor. It should also be appreciated that the retaining tabs may be made as a separate piece affixed to the base plate rather than formed as an integral part of the base plate.

Figure 8:
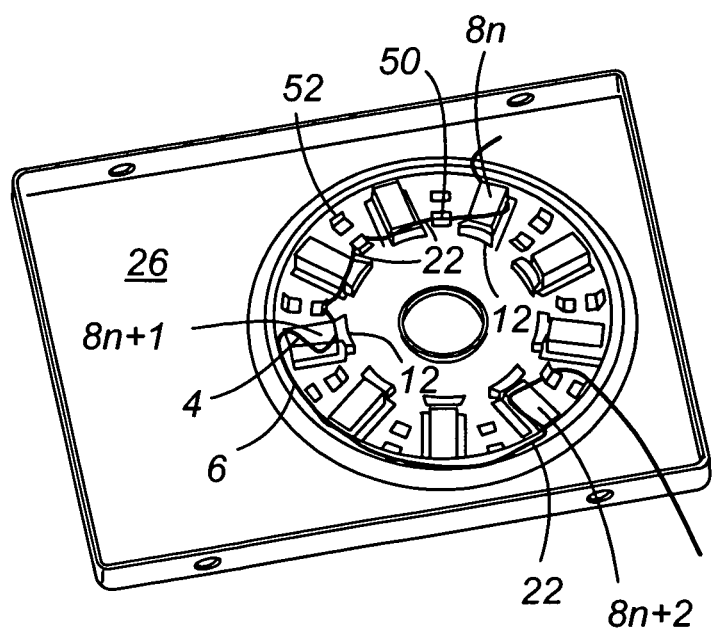
FIG. 8 is a perspective view showing one wire routing method of the present invention.

Referring now to FIG. 8, wire routing methods that may be used with the embodiments of the present invention is shown. With reference to FIG. 8, the wire routing may entail the cross-over wire 22 being directed from the distal end 12 of one tooth 8 to the distal end 12 of the next appropriate tooth $8_{n+1}$ via a path defined by the inner retaining tabs 50. This configuration omits the requirement of rerouting the cross-over wires 22 back to the stator yoke 6.

Figure 9:
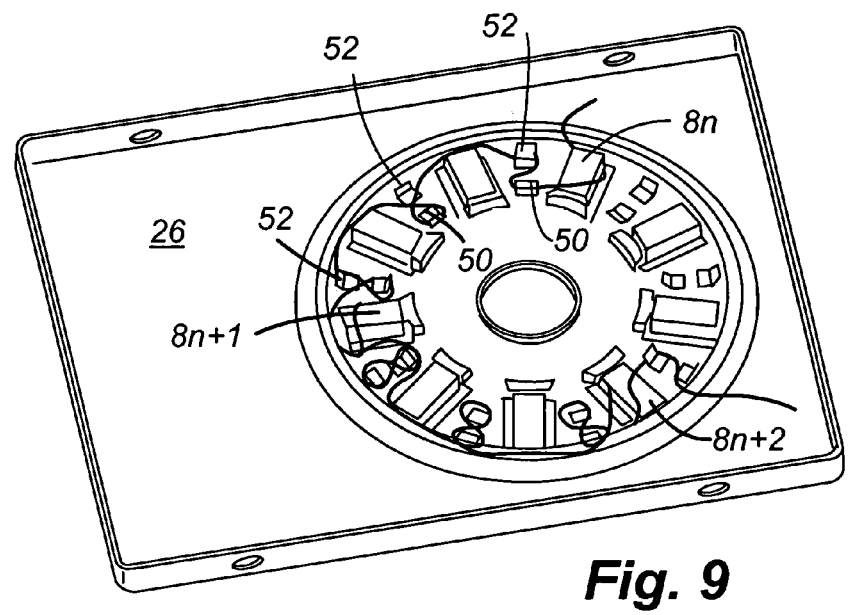
FIG. 9 is a perspective view showing another wire routing method of the present invention.

With reference to FIG. 9, a more traditional method of routing the cross-over wires 22 is shown wherein the wire 16 initially wraps around tooth 8, then interconnects to the inner retaining clip 50 and then is fed to the outer retaining clip 52 and back to the yoke 6. The wire is then fed around the stator yoke and looped around an inner retaining tab 50 and back to the yoke. The wire is then similarly looped around another inner tab 52 and routed to the next appropriate tooth $8_{n+1}$. Alternatively, the cross-over wire 22 may be wound in a figure eight formation around opposing tabs thereby maintaining stiffness in the wire. This is shown in FIG. 9 in routing the cross-over wire from tooth $8_{n+1}$ to tooth $8_{+2}$. It should be appreciated by one skilled in the art that the retaining tabs may secure wires from different sets of three phases of the motor, since the interactions between currents flowing through the wires does not appreciably affect the performance of the system.

Figure 10:
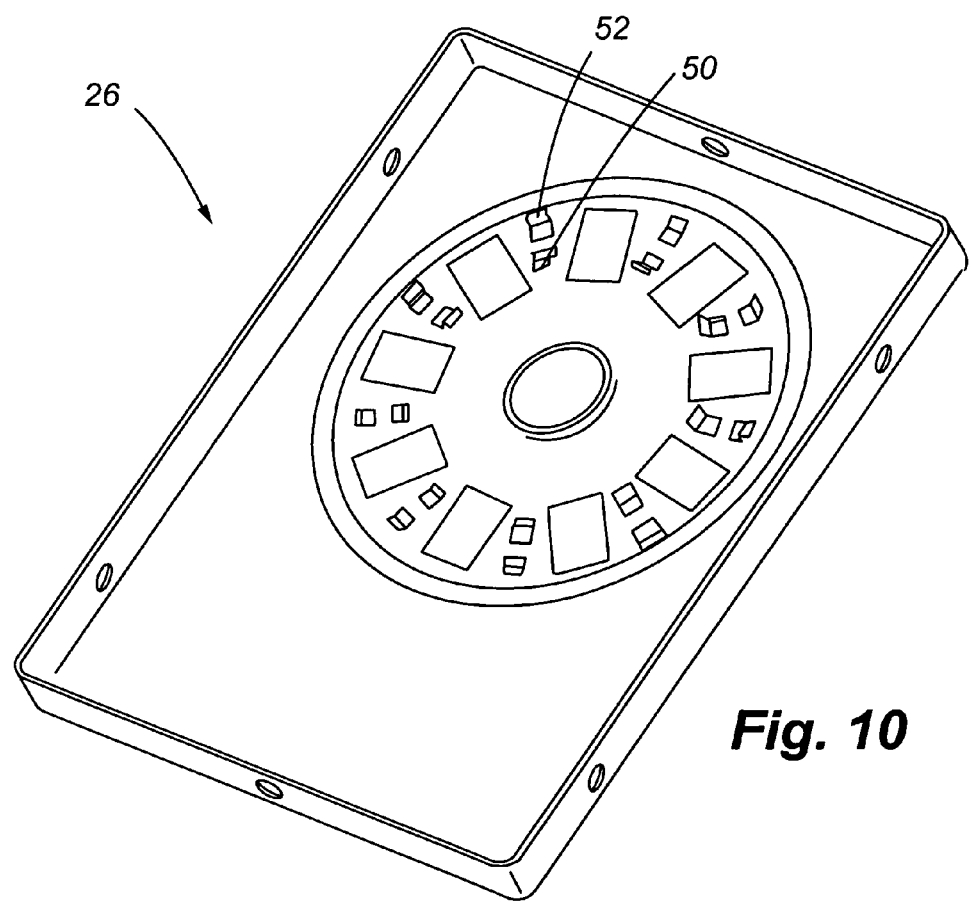
FIG. 10 is a perspective view of the base plate showing the retaining tabs wherein the stator portion of the assembly is removed for clarity.

Referring now to FIGS. 10 and 11, support structures 28 of some embodiments of the present invention are shown. Here, it is illustrated how the retaining tabs may be integrated directly into the generally metallic support structure by stamping. It should be appreciated, as noted previously, that the support structure may be the base plate of a disk drive, or a separate structure inserted into a disk drive housing. In addition, the same tool that is used to stamp the tabs into the base plates may also be used to bend them inwardly and outwardly as required. The design of FIG. 10 includes a separate stamping for each tab 50 and 52, while the embodiment of FIG. 11 shows a single stamping for each pair of tabs.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. An apparatus comprising:
   a motor including a stator and a rotor;
   a base plate, wherein the stator is mounted on the base plate, wherein the stator includes a plurality of stator teeth with windings on each stator tooth; and
   wire routing tabs disposed on said base plate between adjacent stator teeth, wherein the wire routing tabs include at least two wire routing tabs positioned between each pair of adjacent stator teeth.

2. The apparatus of claim 1, wherein said wire routing tabs are integral with the base plate.

3. The apparatus of claim 1, wherein the at least two wire routing tabs are radially aligned relative to an axis of rotation of the motor.

4. The apparatus of claim 3, wherein a first wire routing tab of the wire routing tabs is a first curved member with one end interconnected to said base plate and a second wire routing tab of the wire routing tabs is a second curved member with one end that is interconnected to said base.

5. The apparatus of claim 1, wherein the base plate comprises:
   a planar member, said planar member having a perimeter edge; and
   a raised ridge on the planar member, the raised edge being configured for positioning the stator,
   wherein the wire routing tabs are disposed on the planar member inside of said raised ridge and wherein said wire routing tabs are adapted to secure wires of the stator.

6. The apparatus of claim 5, wherein said wire routing tabs are spaced a predetermined distance from each other and lie on a radial emanating from a center of an aperture in said base plate that is adapted to receive a hub.

7. The apparatus of claim 5, wherein said wire routing tabs are selectively bendable thereby providing a customizable base plate.

8. The apparatus of claim 1, further comprising at least one rotatable storage disk, wherein the motor is for causing rotation of the at least one disk.

9. An apparatus comprising:
   a motor including a stator and a rotor;
   a base plate, wherein the stator is mounted on the base plate, wherein the stator includes a plurality of stator teeth with windings on each stator tooth; and
   wire routing tabs disposed on said base plate between adjacent stator teeth, wherein said wire routing tabs are separate from said base plate, and are interconnected to said base plate.

10. The apparatus of claim 9, further comprising at least one rotatable storage disk, wherein the motor is for causing rotation of the at least one disk.

11. An apparatus comprising:
    a motor including a stator and a rotor;
    a base plate, wherein the stator is mounted on the base plate, wherein the stator includes a plurality of stator teeth with windings on each stator tooth; and
    wire routing tabs disposed on said base plate between adjacent stator teeth, wherein said wire routing tabs are selectively bendable thereby providing a customizable plate.

12. The apparatus of claim 11, wherein said wire routing tabs are integrated into said base plate.

13. The apparatus of claim 11, wherein said wire routing tabs are interconnected to said base plate.

14. The apparatus of claim 11, wherein said wire routing tabs comprise curved members with one end interconnected to said base plate.

15. The apparatus of claim 11, wherein at least one wire routing tab is disposed between each pair of adjacent stator teeth.

16. The apparatus of claim 11, further comprising at least one rotatable storage disk, wherein the motor is for causing rotation of the at least one disk.

17. An apparatus, comprising:
    a base plate;

a spindle motor interconnected to said base plate, said spindle motor having a generally circular stator yoke with a plurality of wire coils extending inwardly from said yoke, said wire coils are interconnected in phases by cross over wires; and first and second tabs located between each pair of adjacent wire coils, wherein said first and second tabs secure the cross over wires that interconnect the plurality of wire coils.

18. The apparatus of claim 17, wherein said stator yoke comprises a first coil, a fourth coil and a seventh coil interconnected by a first cross over wire defining a first phase; a second coil, a fifth coil and an eighth coil interconnected by a second cross over wire defining a second phase; and a third coil, a sixth coil and a ninth coil interconnected by a third cross over wire defining a third phase; and wherein each of said first, second and third cross over wires being retained by at least one of said first and second tabs as said first, second and third cross over wires are routed between the coils of each phase.

19. The apparatus of claim 17, further comprising a rotatable media mounted to the spindle motor.

20. A method comprising:
 a. obtaining a support structure;
 b. positioning a multi-phase stator on the support structure, the stator comprising a plurality of stator teeth having a wire coil wound about each of the plurality of stator teeth, the stator further comprising cross over wires extending from one wire coil to another within each phase; and
 c. routing the cross over wires around routing tabs disposed between the individual stator teeth of the plurality of stator teeth, said routing tabs disposed on said support structure.

21. The method of claim 20, wherein said routing tabs are integral with the support structure.

22. The method of claim 21, further comprising deploying the routing tabs as needed to retain the cross over wires.

23. The method of claim 20, wherein said support structure is a base plate.

24. The method of claim 20, further comprising moving the routing tabs from a first position to a second position, wherein the routing tabs cannot route a wire when in said first position but said routing tabs can route a wire when in the second position.

25. The method of claim 20, wherein the stator comprises a generally circular yoke, further comprising routing the cross over wires form one wire coil to another among the routing tabs and along the yoke.

26. A method comprising:
 a. obtaining a stator core, the stator core comprising a generally circular yoke and a plurality of teeth extending radially inwardly from the yoke, the teeth having a proximate end connected to said yoke and a distal end opposite the proximate end;
 b. winding wire around each of the individual teeth to form a stator coil around each tooth, each stator coil comprising at least one layer of windings;
 c. connecting a first subset of the plurality of teeth with a first wire to form a first phase of a spindle motor, and further including first cross over wire portions extending between the plurality of teeth forming the first phase;
 d. connecting a second subset of the plurality of teeth with a second wire to form a second phase of the spindle motor, and further including second cross over wire portions extending between the plurality of teeth forming the second phase;
 e. positioning the stator core with the stator coils on a support structure; and
 f. routing the first and second cross over wire portions around retaining tabs disposed between adjacent stator coils and formed on the support structure.

27. The method of claim 26, further comprising forming each stator coil with an odd number of winding layers.

28. The method of claim 26, further comprising starting the windings for at least one of the stator coils at the distal end of one of the teeth.

29. The method of claim 26, further comprising finishing the windings of at least one of the stator coils at the distal end of one of the teeth.

30. The method of claim 26, further comprising forming two retaining tabs between at least two adjacent stator coils.

31. The method of claim 26, further comprising forming two retaining tabs between each adjacent pair of stator coils.

32. The method of claim 26, further comprising routing some of the first cross over wire portions around two of the retaining tabs positioned between two adjacent stator coils.

33. The method of claim 26, further comprising routing some of the first and second cross over wire portions around the same retaining tabs.

34. An apparatus comprising:
 a support structure;
 a stator mounted on said support structure, said stator comprising a substantially circular yoke and a plurality of teeth extending radially inwardly from the yoke, the teeth having a proximate end joined to the yoke and a distal end opposite the proximate end;
 a wire coil wound around each tooth, each coil comprising at least one layer of windings, the coils connected by cross over wires in phases to form a multi-phase stator, wherein at least one wire coil has an odd number of winding layers; and
 wire routing tabs formed on said support structure and disposed between adjacent teeth, wherein at least portions of the cross over wires are secured by the routing tabs.

35. The apparatus of claim 34, wherein at least one of the wire coils starts at the distal end of one of the teeth.

36. The apparatus of claim 34, wherein at least one of the wire coils terminates at the distal end of one of the teeth.

37. The apparatus of claim 34, wherein said support structure comprises a base plate.

38. The apparatus of claim 34, wherein said support structure comprises a first planar portion and said routing tabs are formed from said first planar portion.

39. The apparatus of claim 38, wherein the routing tabs are movable between a first position in which the routing tabs and first planar potion are co-planar, and a second position in which the routing tabs and first planar portion are not co-planar.

40. The apparatus of claim 34, further comprising:
 a motor, wherein the motor includes the stator; and
 at least one rotatable storage disk, wherein the motor is for causing rotation of the at least one disk.

* * * * *